Figure 1:
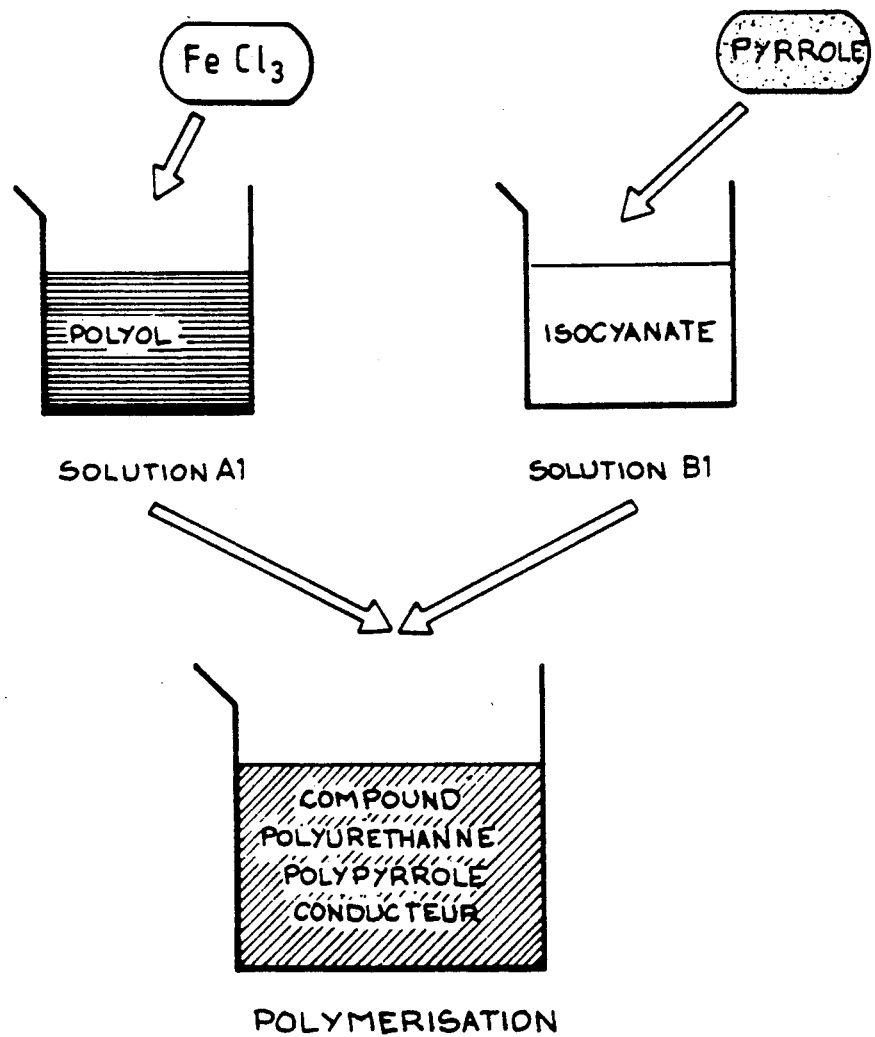

United States Patent [19]

Lacour

[11] Patent Number: 5,247,001
[45] Date of Patent: Sep. 21, 1993

[54] CONDUCTING POLYMER AND PROCESS FOR THE PRODUCTION OF SUCH A POLYMER

[75] Inventor: Olivier Lacour, Cagnes Sur Mer, France

[73] Assignee: Thomson-CSF, Puteaux, France

[21] Appl. No.: 778,142

[22] PCT Filed: Jun. 15, 1990

[86] PCT No.: PCT/FR90/00432
§ 371 Date: Dec. 24, 1991
§ 102(e) Date: Dec. 24, 1991

[87] PCT Pub. No.: WO91/00314
PCT Pub. Date: Jan. 10, 1991

[30] Foreign Application Priority Data

Jun. 30, 1989 [FR] France ................... 89 08802

[51] Int. Cl.$^5$ .......................... C08J 3/00; C08K 5/04; C08L 75/00; C08G 18/08
[52] U.S. Cl. .................... 524/398; 524/590; 524/717; 524/785; 524/871; 528/52; 528/56; 528/64
[58] Field of Search ........... 528/64, 56, 52; 524/590, 717, 718, 785, 104, 398, 785, 874, 871

[56] References Cited

U.S. PATENT DOCUMENTS 4,617,353  10/1986  Myers ................... 525/245
4,935,165  6/1990  Wessling et al. ........... 525/197

FOREIGN PATENT DOCUMENTS 0168620  1/1986  European Pat. Off. .
0195381  9/1986  European Pat. Off. .
0234467  9/1987  European Pat. Off. .

OTHER PUBLICATIONS

Database Chemical Abstracts, (Note: STN), vol. 108, No. 8, 1987, (Columbus, Ohio, US), Xiantong Bi et al.: "An electrically conductive composite prepared by electrochemical polymerization of pyrrole into polyurethane", voir resume No. 64505z, & Synth. Met. 22(2), 145–156.

Primary Examiner—Paul R. Michl
Assistant Examiner—Patrick Niland
Attorney, Agent, or Firm—Oblon, Spivak, McClelland, Maier & Neustadt

[57] ABSTRACT

The invention relates to composite conducting polymers.

It comprises producing a composite polymer comprising a base polymer formed from a normal polyurethane in which a conducting polymer formed from doped polypyrrole is dissolved.

It enables a conducting polypolymer to be obtained, the mechanical characteristics of which are very substantially those of a normal polyurethane.

8 Claims, 3 Drawing Sheets

CONDUCTING POLYMER AND PROCESS FOR THE PRODUCTION OF SUCH A POLYMER

The present invention relates to electrically conducting polymers and to production processes which enable such polymers to be obtained.

Plastic materials, which are essentially formed from a polymer mixed with a number of additives, are, from their origin, particularly suitable for the production of parts of complex shapes which are electrically insulating. It is now known to produce plastic materials which are also able to conduct electricity. These new materials are particularly useful in the low-power electrical field and for electromagnetic shielding. This latter application is particularly useful because of the multiplication both of disturbing electrical and electromagnetic fields and of electronic devices liable to be disturbed by these fields.

It is known to produce a polymer having a high electrical conductivity by assigning thereto conducting fillers such as metal particles, carbon black or metalized fibres. The electrical properties of such a composite polymer depend not only on the electrical properties of the materials comprising the matrix and the inclusions but also on the geometric shape of these inclusions (spherical, elongated, and the like) and the way in which the operation of mixing the inclusions into the elastomer has been conducted. In particular, the conducting fillers tend to form aggregates, which gives rise to the inclusion of a large amount of air in the mixture finally obtained. The presence of this air tends to reduce the conductivity of the whole, which leads to overloading of the material with conducting particles relative to the amount which would be necessary a priori for a composition without air. This overload modifies the mechanical properties of the composite material obtained to an extreme extent, essentially adversely.

It is also known to obtain intrinsically conducting polymers, such as polyacetylene, polyphenylene sulfide and the like. The conductivity is obtained by chemical or electronic modification, such as doping.

Although the conductivity thus obtained is sufficiently high for the desired applications, the other properties necessary for a correct use of these materials, in particular the stability to air, the thermal stability, the ease of use and the possibility of obtaining solid parts, are not achieved, at the very least not at the same time.

Figure 2:
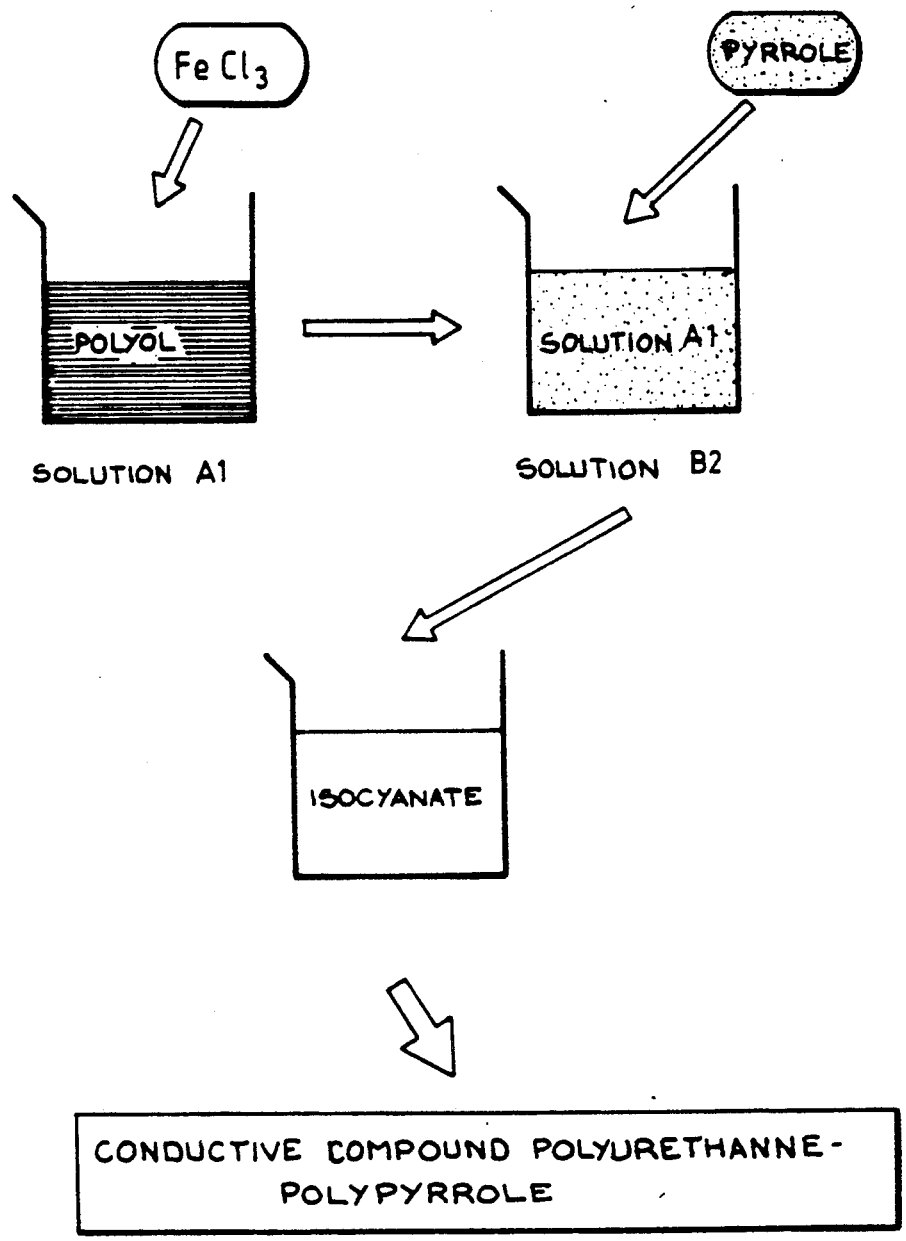

In order to alleviate these disadvantages, the invention proposes a process for the production of a composite conducting polymer, characterized in that a first solution formed from a mixture of polyol and iron chloride anhydride $FeCl_3$ is first prepared and in that this solution is then mixed with pyrrole and a polyisocyanate Other features and advantages of the invention will become more clearly apparent in the following description, which is given with reference to the appended figures, which represent:

FIG. 1: a diagram of a first process for the production of a polymer according to the invention;

FIG. 2: a diagram of a second process for the production of such a polymer; and

Figure 3:
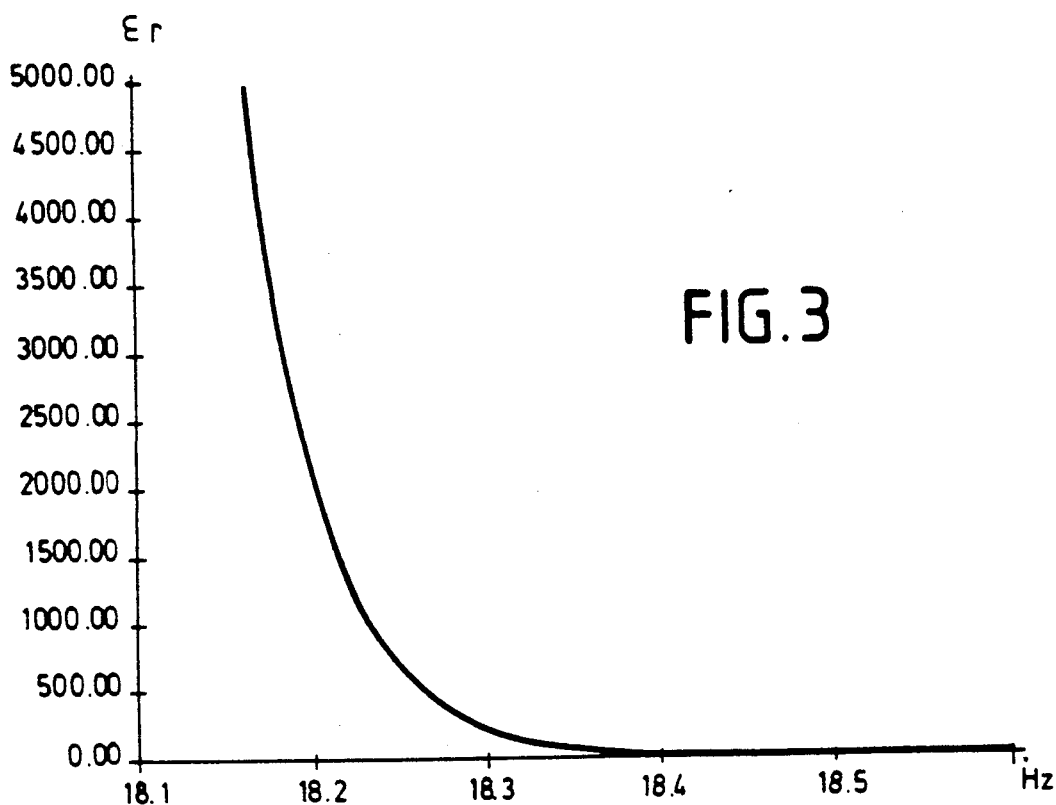
Figure 4:
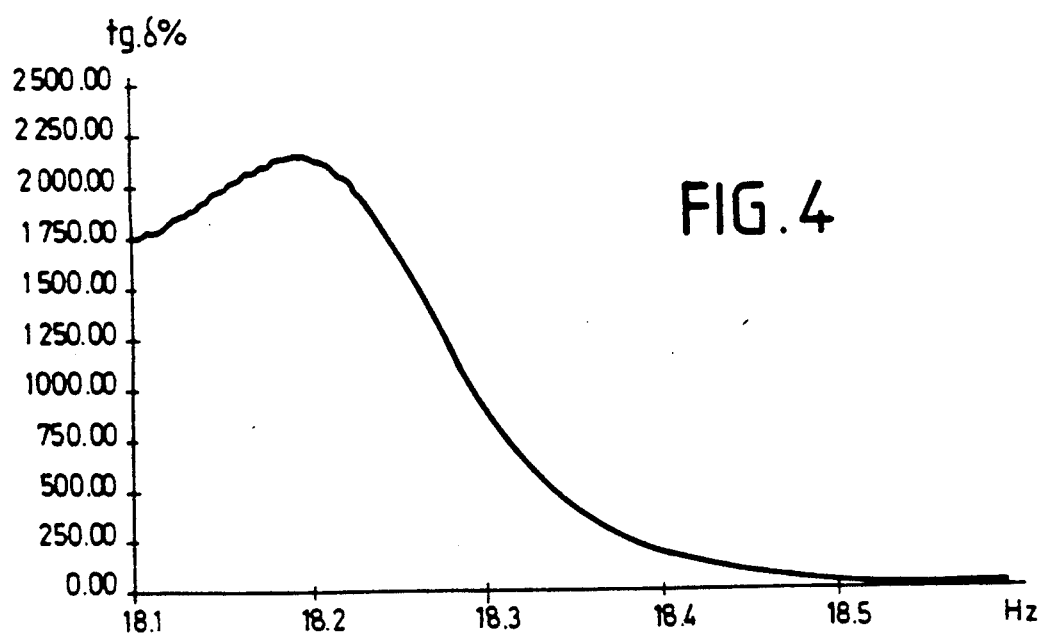

FIGS. 3 and 4: characteristic curves of the electrical properties of these materials.

Polyurethanes are polymers which belong to a family whose members may have very different electrical and mechanical properties. A polyurethane is a polymer which possesses the urethane chemical group, the formula of which is >N—CO—O—, repeated more or less regularly.

These polymers are obtained from two liquid compounds: a polyol and a polyisocyanate monomer which contains at least 2 NCO groups. On mixing these, a chemical reaction is caused which initiates a cross-linking of the reaction product, which results in a synthetic elastomer being obtained.

On the other hand, it is known to polymerise pyrrole, the formula of which is: $C_4H_5N$, by chemical, electrothermal or thermal routes, in liquid phase or in vapor phase. If an electronic modification of the polypyrrole is induced during this polymerization, by doping or by oxidation, the conductivity of the polymer obtained is modified, the polymer becoming conductive.

The base elements used to produce the polymer according to the invention are a polyol, a polyisocyanate, pyrrole and a doping agent for this pyrrole, which in the illustrative embodiment described is anhydrous iron chloride $FeCl_3$.

In a first embodiment, shown in FIG. 1, of the process according to the invention, the first step is to dissolve the doping agent $FeCl_3$ in the polyol in order to obtain a first solution A1.

The pyrrole is then dissolved in the polyisocyanate in order to obtain a second solution B1.

In a final stage the two solutions A1 and B1 are mixed, which causes the polymerization of the polyurethane and the pyrrole, which gives a conducting composite polymer of polyurethane and polypyrrole.

The two solutions A1 and B1 are obtained extremely easily since, on the one hand, anhydrous iron chloride is soluble in the polyol and, on the other hand, the pyrrole and the polyisocyanate are liquid products which mix easily.

Depending on the nature of the polyol and of the polyisocyanate used in order to obtain the desired polyurethane, an aqueous or non-aqueous solvent may also be used to react the components with one another, which is sometimes necessary for some types of polyurethane.

In the case corresponding to the example described, where iron chloride is used as doping agent for polypyrrole, it has been found that a concentration of close to two mols of anhydrous iron chloride per mole of pyrrole enables a sufficient conductivity of the composite polymer thus obtained to be achieved. Other doping agents for polypyrrole could be used, such as iodine, bromine or arsenic fluoride $AsF_5$, and the like.

It has been found that the conductivity of the polymer obtained of course increases with the concentration of doped polypyrrole but that it tends toward a limit and that this limit is obtained according to the experimental conditions for a concentration by volume of doped polypyrrolé of between 2 and 3%.

This relatively low percentage in order to obtain a satisfactory conductivity enables the physical properties and the conditions for use of the base polyurethane to be very substantially retained. Thus, the bulk modulus and the modulus of elasticity in shear and the density of the polypolymer are substantially those of the base polyurethane which thus retains all of its original characteristics.

Several of the chemical reactions used in this preparation are exothermic. This is the case in particular for hydration of the iron chloride during mixing with the polyol and for the respective polymerizations of the polyurethane and of pyrrole. In order not to affect adversely the characteristics of the final material, it is useful to slow down the chemical reactions and to reduce the exothermic phenomena by carrying out the various mixing of products in a thermostat-controlled chamber at a temperature close to 5°.

A second embodiment of the invention comprises, as shown in FIG. 2, using a solution A1 of iron chloride in the polyol as the starting material in this case also. Pyrrole is then incorporated in this solution A1, which initiates the polymerization of pyrrole and gives a solution B2.

The solution B2 thus obtained is finally mixed with the polyisocyanate in order to cause the polymerization of the polyurethane.

This second embodiment differs from the first only in the order of mixing, and the respective proportions of the products to be used do not differ from the first embodiment.

In FIGS. 3 and 4 the modulus of complex relative permittivity $\epsilon_1$ and, respectively, the dielectric loss factor tan a of a polyurethane/polypyrrole polypolymer according to the invention containing 2% of polypyrrole are shown as a function of the frequency in hertz.

These curves are to be compared with the corresponding values for pure polyurethane, which serves as base for the mixture. A pure polyurethane of this type has a complex relative permittivity of close to 7 $_0$ and a dielectric loss factor of less than 10% over the entire measurement range.

These graphs therefore show that the conducting composite prepared according to the invention has a very high dielectric loss factor at low frequencies, which passes through a maximum of about 2150% at a frequency close to 100 Hz. It is recollected that the higher the loss factor the more conductive is the material.

In conclusion, the invention makes it possible to obtain, by incorporating about 2% by volume of doped polypyrrole in a polyurethane, a conducting polymer which has substantially all of the characteristics, in particular mechanical characteristics, of the polyurethane while having an entirely satisfactory conductivity. Moreover, the method of preparation is entirely similar to the very simple method of preparation of ordinary polyurethane.

I claim:

1. A process for the production of a composite conducting polymer, comprising:
   preparing a first solution of a polyol and iron chloride ($FeCl_3$); and
   mixing the prepared first solution with pyrrole and a polyisocyanate and polymerizing the monomers in solution.

2. The process of claim 1, wherein the pyrrole and polyisocyanate are mixed separately to prepare a second solution, said first and second solutions being combined to completely mix all reactants.

3. The process of claim 1, wherein after having prepared the first solution, pyrrole is mixed into the first solution to prepare a second solution, and then this second solution is mixed with said polyisocyanate.

4. The process of claim 1, 2 or 3, wherein the proportion by volume of pyrrole is less than 3%.

5. The process of claim 4, wherein said proportion ranges from 2 to less than 3%.

6. The process of claim 4, wherein said proportion of pyrrole is substantially equal to 2%.

7. The process of claim 1, wherein the proportion of iron chloride is essentially equal to two moles of $FeCl_3$ per mole of pyrrole.

8. The process of claim 1, wherein the steps of the process are conducted while maintaining a substantially constant temperature close to 5° C.

* * * * *